US012528992B2

(12) United States Patent
Eatough et al.

(10) Patent No.: US 12,528,992 B2
(45) Date of Patent: Jan. 20, 2026

(54) CUSTOM COKE PRODUCTION

(71) Applicants: Craig Eatough, Provo, UT (US);
Jonathan S. Heaton, Mapleton, UT (US); Leon D. Smoot, Provo, UT (US);
Steven R. Eatough, Provo, UT (US);
Ambar L. Montero, Pleasant Grove, UT (US)

(72) Inventors: Craig Eatough, Provo, UT (US);
Jonathan S. Heaton, Mapleton, UT (US); Leon D. Smoot, Provo, UT (US);
Steven R. Eatough, Provo, UT (US);
Ambar L. Montero, Pleasant Grove, UT (US)

( * ) Notice: Subject to any disclaimer, the term of this patent is extended or adjusted under 35 U.S.C. 154(b) by 143 days.

(21) Appl. No.: 18/228,138

(22) Filed: Jul. 31, 2023

(65) Prior Publication Data

US 2024/0002732 A1  Jan. 4, 2024

Related U.S. Application Data

(63) Continuation-in-part of application No. 16/335,831, filed on Apr. 28, 2021, now abandoned.

(51) Int. Cl.
C10B 53/04 (2006.01)
B01F 23/60 (2022.01)
C10B 57/04 (2006.01)
G01N 33/22 (2006.01)
G05B 13/02 (2006.01)
B01F 101/00 (2022.01)

(52) U.S. Cl.
CPC .............. *C10B 53/04* (2013.01); *B01F 23/69* (2022.01); *C10B 57/04* (2013.01); *G01N 33/222* (2013.01); *G05B 13/021* (2013.01); *B01F 2101/2204* (2022.01); *G05B 2219/45241* (2013.01)

(58) Field of Classification Search
CPC ....... C10B 57/04; C10B 57/045; C10B 57/06; C10L 5/04; C10L 5/366
See application file for complete search history.

(56) References Cited

U.S. PATENT DOCUMENTS 10,975,311 B2 *  4/2021  Quanci .................... C10L 5/04
2016/0186065 A1 *  6/2016  Quanci .................... C10L 5/36
                                                                         201/20

\* cited by examiner

*Primary Examiner* — Jonathan Luke Pilcher

(57) ABSTRACT

In one embodiment, a method for producing coke that includes mixing at least a first and a second carbonaceous material into a single feedstock of carbonaceous material. The coking feasibility of the single feedstock of carbonaceous material is then determined. The single feedstock is customized into a predetermined material composition, and then the customized single feedstock is pyrolyzed to produce coke material and coke by-products. Other embodiments are also disclosed.

8 Claims, 3 Drawing Sheets

CUSTOM COKE PRODUCTION

BACKGROUND OF THE INVENTION

1. Technical Field

The present invention relates generally to coke processing, and, more specifically, to selecting a custom coke processing method.

2. Description of the Related Art

Various coke processing methods are known in the art. For example, U.S. Pat. No. 7,785,447 issued to Eatough et al., discloses concepts related to clean coke processing such as continuously producing a high-grade of coke from low-grade materials without causing a pollution problem.

In addition, the International Journal of Coal Geology points out that CSR (Coke Strength after Reaction) and CRI (Coke Reactivity Index) indices may be used to indicate coke strength; e.g., high quality coke means CRI is low and CSR is high. It is to be recognized that CSR and CRI indices were developed as coke quality indicators of coke produced with traditional oven methods.

The following disclosure is a Continuation-in-Part of U.S. patent application Ser. No. 16/335,831 which relates to further improvements in the art; non-obvious improvements, as demonstrated by the failure of those of ordinary skill in the art to implement such improvements after having available the benefit of these earlier coking disclosures.

SUMMARY

It has been discovered that at least the aforementioned challenges are resolved by a method as disclosed herein. Upon viewing the present disclosure, one of ordinary skill in the art will appreciate that variations of principles according to the present invention could be contemplated.

For example, in one inventive embodiment, a method for producing coke is disclosed where at least a first and a second source of carbonaceous material are added into a mixer. These sources of carbonaceous material are mixed and can be considered a single feedstock of carbonaceous material.

The single feedstock begins to be pyrolyzed and is analyzed to determine its coking feasibility. Depending on the analysis, the single feedstock is customized into a predetermined material composition. This composition then continues to be pyrolyzed in a pyrolyzer to produce coke material.

It should be noted that the first source of carbonaceous material could be coal fines, and the second source of carbonaceous material could be coke waste fines. Other material and combinations of material are also possible. Further, pyrolyzing the customized single feedstock of carbonaceous material may include producing a high-grade coke material.

In addition, the predetermined material composition may be selected from the group consisting of a particular composition, a particular reactivity, a particular shape, a particular by-product generation, a particular size, a particular strength, and a particular heating value.

In another embodiment, a method for producing coke includes mixing at least a first and a second carbonaceous material. The coking feasibility of the single feedstock of carbonaceous material is then determined.

Based on the determination of paragraph [0007], the single feedstock continues to be customized into a predetermined material composition. The customized single feedstock is pyrolyzed to produce coke material and coke by-products.

In some cases, the predetermined material composition is selected from the group consisting of a particular composition, a particular reactivity, a particular shape, a particular by-product generation, a particular size, a particular strength, and a particular heating value.

In a specific embodiment, a method for producing coke includes introducing a first source of carbonaceous material as a first feedstock into a mixer, and introducing a second source of carbonaceous material as a second feedstock into the mixer. These two sources of carbonaceous materials are mixed into a single feedstock of carbonaceous material where possible a third material is added to the feedstock mixture.

The single feedstock of carbonaceous material is again analyzed to determine its coking feasibility, and then continues to be customized into a predetermined material composition that allows the customized single feedstock to be pyrolyzed to produce coke material which has at least a 600 lbs per square inch crushing strength.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
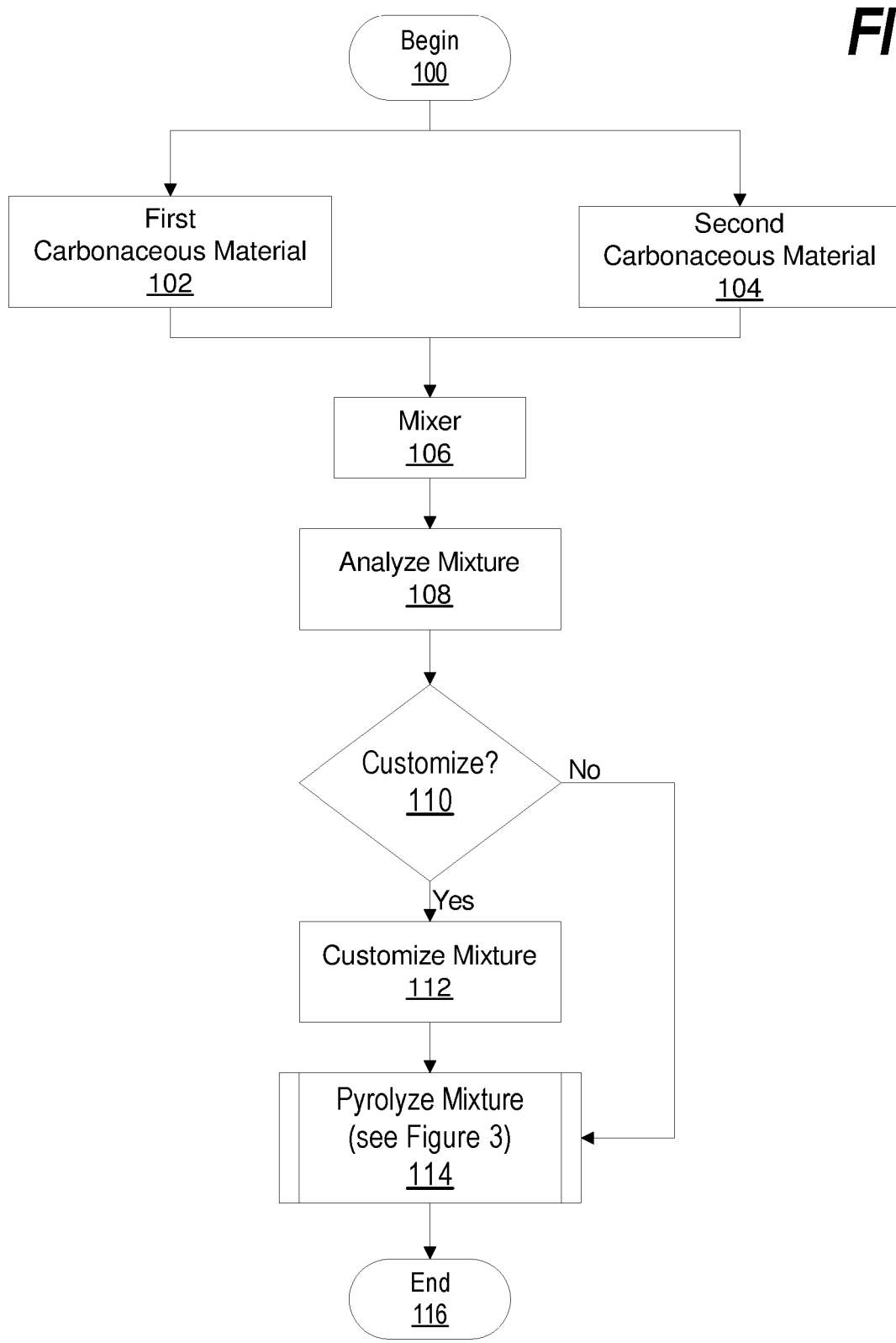
FIG. 1 is a flow diagram showing a first embodiment of a custom coking process according to principles of the present invention.

The following provides a detailed description of examples of the present invention and should not be taken to be limiting of the invention itself. Rather, any number of variations may fall within the scope of the invention, which is defined in the claims following this detailed description.

Reference will now be made in detail to embodiments of the invention illustrated in accompanying drawings. Whenever possible, the same or similar reference numerals are used in the drawings and the description to refer to the same or like parts, acts, or steps. The drawings are in simplified form.

Those of ordinary skill in the art will appreciate that in the development of any such actual implementation, as in any engineering or design project, numerous implementation-specific decisions must be made to achieve the developer's specific goals, such as compliance with system-related, metallurgical-related constraints, which may vary from one implementation to another. Such would be a routine undertaking of design, fabrication, and manufacture for those of ordinary skill in the art and having the benefit of the present disclosure.

These coke processes do not require high-quality coking coals, nor are they limited to only two inputs of carbonaceous materials. Further, the disclosed processes use feedstock material more efficiently because "waste" products or fines may be used to create high-quality coke and thereby, among other things, contribute to what is environmentally friendly coke production. In addition, energy savings are recognized at least in part due to the reduced time required to produce this high-quality coke.

Coal blending for coke production varies in the number of coals used. It also varies with the proportion, rank, coking properties, and geographical origin of the coal components. Coal selection and blend composition are major factors controlling physical and chemical coal properties. These factors contribute to what is sometimes referred to as devolatilization behavior.

As aids to coal selection for coke quality predictions, several mathematical models are available. These can be divided into two groups. The first group of models focuses on the prediction of cold mechanical, metallurgical, or "met" coke strength.

The second group of models uses the CSR and CRI indices as coke quality parameters. At this writing, no universal prediction model has been recognized, especially for custom coke production. Some coals or blends show significant deviations between prediction results based on a model and actual use.

Of note, almost all of today's coking plants use some sort of a model to try to predict coal rank, petrology, rheological properties, and ash chemistry. However, in the past, unlike the presently disclosed inventive embodiments, batteries of heat-recovery ovens were needed to attempt to accomplish the results predicted by the models. To attempt to operate in environmentally friendly modes, some ovens operated under suction with no emissions during the coking process.

FIG. 1 is a flow diagram showing a first embodiment of a custom coking process according to principles of the present invention.

In the illustrated embodiment, the process begins at oval 100. After oval 100, a first and a second process block 102, 104 are illustrated as combining carbonaceous materials in a mixer at mixer block 106.

The mixer ingredients are then analyzed at process block 108. In particular embodiments, the mixture will be customized for a future pyrolyzation step where coke is formed. As indicated at decision block 110, if the question of whether to customize the mixture is answered in the affirmative, "Yes" branch is taken and customization occurs at process block 112.

Customization can include shape, size, percentage of and type of carbonaceous fines to be used in pyrolyzation, and so forth. For example, where the mixture indicates the type of output that will be produced through a future pyrolyzation step, if the carbonaceous mixture so indicates, it may be formed into robust shells that are filled with carbonaceous fines prior to the heating step of pyrolyzation.

Figure 3:
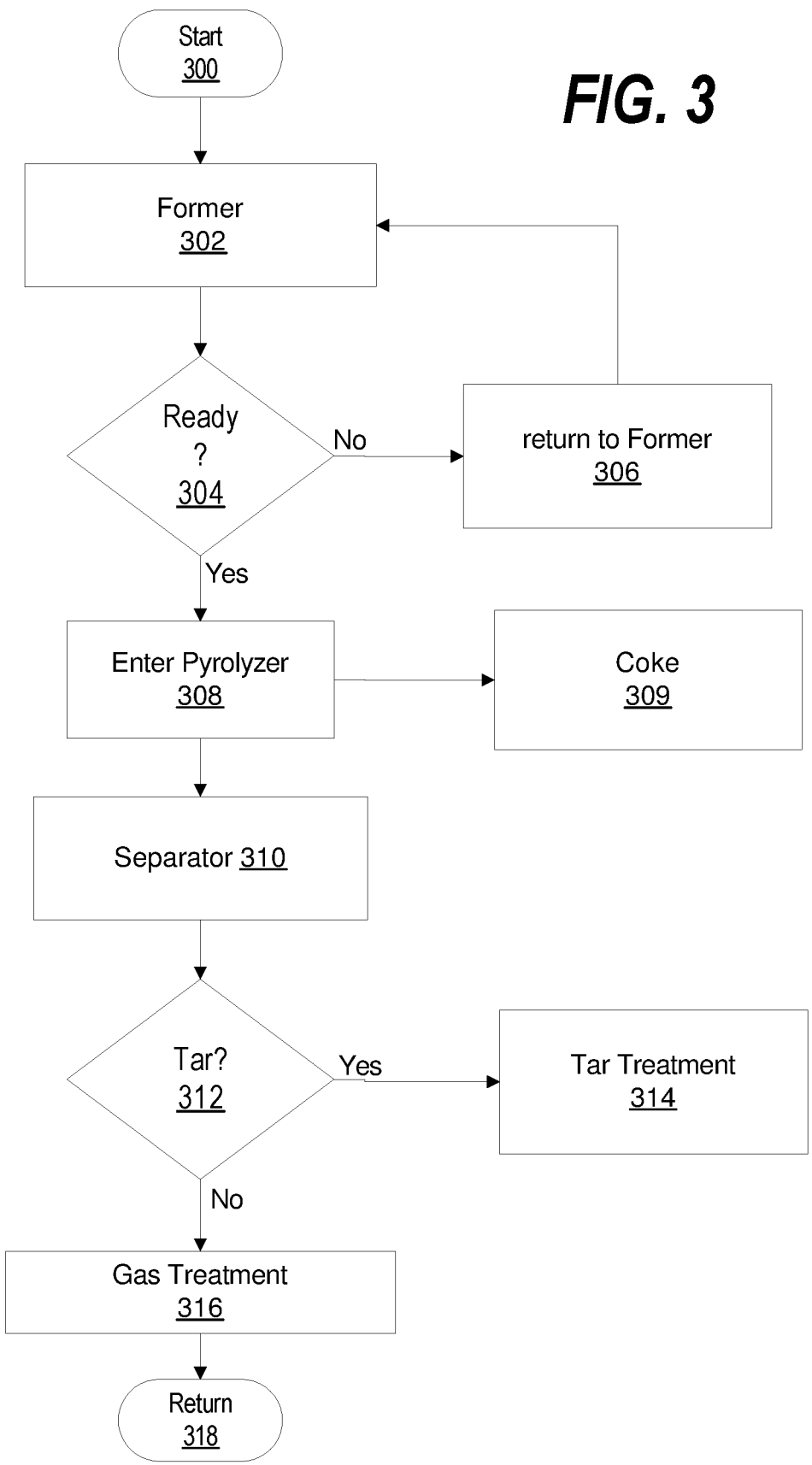
FIG. 3 is a flow diagram showing pyrolyzation of a mixture formed according to the methods of FIG. 1 or 2.

Otherwise, process block 112 is skipped and the mixture is passed directly to pyrolyzer process block 114 which is described in more detail in FIG. 3.

Finally, as indicated by oval 116, the flow diagram of FIG. 1 comes to an end and the custom coke production has completed.

Figure 2:
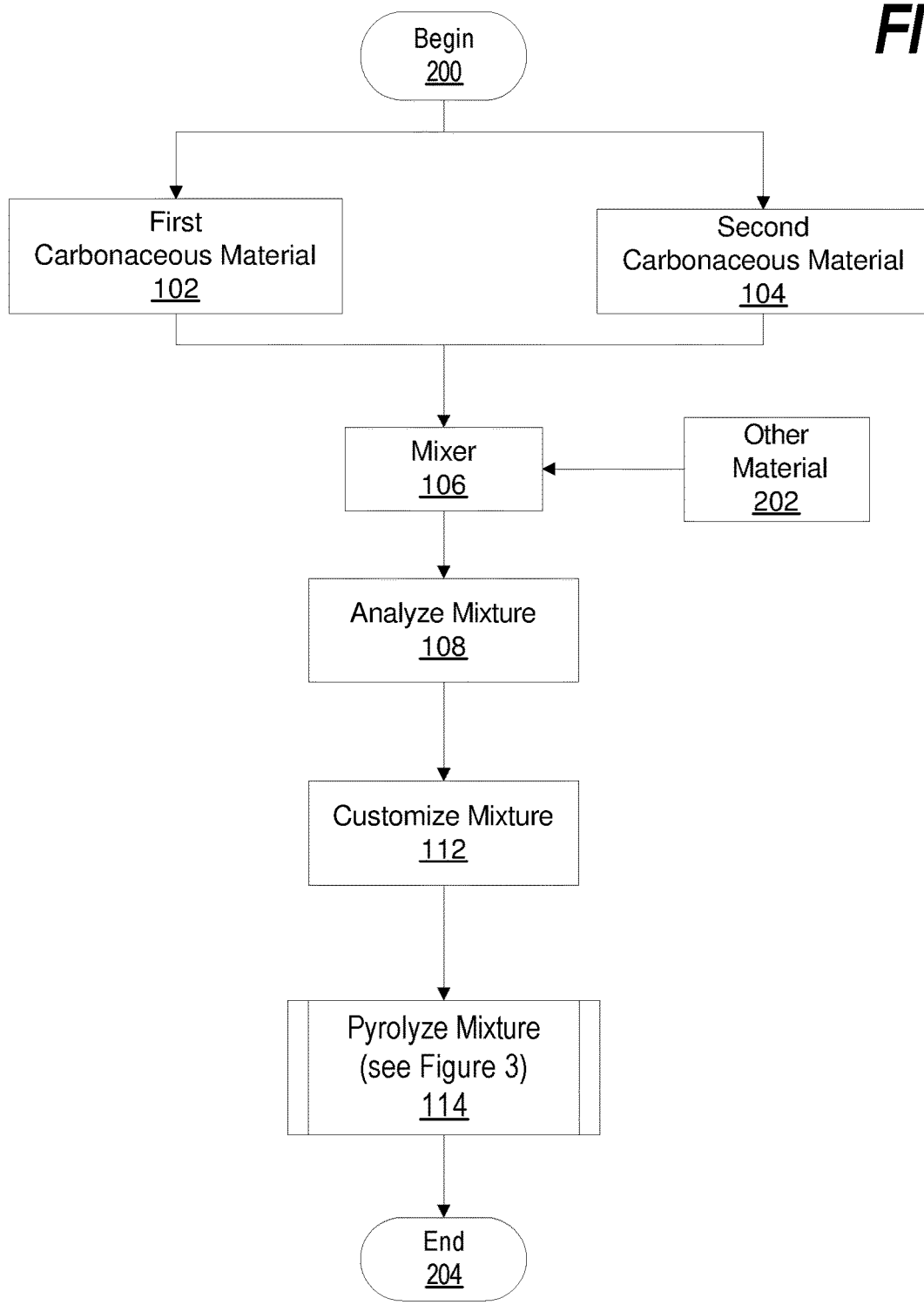
FIG. 2 is another flow diagram showing a second embodiment of the process of FIG. 1.

FIG. 2 is another flow diagram showing a second embodiment of the process of FIG. 1. However, in the FIG. 2 embodiment, coking process begins at oval 200, and ends at oval 204 after following a similar process as the coking process of FIG. 1. However, process block 202 shows that other material is introduced into the mixer process 106. This other material could be any number of things such as additional carbonaceous material, additional non-carbonaceous material, multiple combinations of such materials, and so forth.

FIG. 3 is a flow diagram showing pyrolyzation of a mixture formed according to the methods of FIG. 1 or 2. For ease of understanding, the pyrolyzer step 114 of FIGS. 1 and 2 begins at oval 300 and moves to process block 302 for properly forming introduced mixtures. After former block 302, decision block, diamond 304, is taken.

If it is determined that the mixer ingredients are not ready for pyrolyzation, as indicated at process block 306, the mixer ingredients are returned to process block 302 for further forming.

Once diamond 304 indicates that the mixer ingredients are ready for pyrolyzation, the mixer ingredients enter the pyrolyzation process block 308 and coke is produced at process block 309.

In addition, separator 310 is illustrated where the pyrolyzed mixture may be separated into tars and gases. Decision block 312 is the step where it is decided if useable tars are present. If so, "yes" branch is taken and tar treatment process block 314 is entered.

Alternatively, or in addition, "no" branch is taken and gas treatment process block 316 is used. Following gas treatment 316, oval 318 indicates that the method returns to the previous Fig.

Upon viewing the present disclosure, those of ordinary skill in the art will appreciate that other equivalent materials and steps could be substituted to realize the presently disclosed invention.

Although various disclosure embodiments have been described in the foregoing detailed description and illustrated in the accompanying drawings, it will be understood that the presently disclosed invention is not limited to the embodiments disclosed, but indeed may assume numerous arrangements, re-arrangements, modifications, and substitutions of elements or steps without departing from the spirit and intended scope of the invention herein set forth. The appended claims are to encompass within their scope all such changes and modifications as are within the true spirit and scope of this invention.

Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present.

For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for producing coke comprising:
introducing a first source of carbonaceous material as a first feedstock into a mixer;
introducing a second source of carbonaceous material as a second feedstock into the mixer;
mixing at least the first and second source carbonaceous materials into a single feedstock of carbonaceous materials;
beginning pyrolyzation of the single feedstock of carbonaceous materials;
while pyrolyzing the single feedstock of carbonaceous materials, analyzing said single feedstock of carbonaceous materials to determine if pyrolyzing the single feedstock will produce a predetermined pyrolyzation output;
after said analyzing, while continuing the pyrolyzing of the single feedstock of carbonaceous materials, customizing said single feedstock into a predetermined material composition to form a customized single feedstock;
also while continuing the pyrolyzing of the single feedstock of carbonaceous materials, determining if further customizing of the single feedstock of carbonaceous materials is needed to produce the predetermined pyrolyzation output; and
continuing the pyrolyzing of said customized single feedstock of carbonaceous materials in a pyrolyzer to produce coke material.

2. The method of claim 1 wherein the first source of carbonaceous material is coal fines.

3. The method of claim 1 wherein the second source of carbonaceous material is coke waste fines.

4. The method of claim 1 wherein said pyrolyzing the customized single feedstock of carbonaceous materials comprises the act of producing a met coke material.

5. The method of claim 1 wherein the predetermined material composition is a particular composition comprising:
a composition corresponding to a particular reactivity;
a composition comprising particles of a particular shape;
a composition corresponding to a particular by-product generation;
a composition comprising particles of a particular size;
a composition corresponding to a particular strength; and
a composition corresponding to a particular heating value.

6. A method for producing coke comprising:
mixing at least a first and a second carbonaceous material into a single feedstock of carbonaceous materials;
begin pyrolyzing the single feedstock of carbonaceous materials;
while pyrolyzing the single feedstock of carbonaceous materials, analyzing said single feedstock of carbonaceous materials to determine if the pyrolyzing of the single feedstock will produce a predetermined pyrolyzation output;
determining coking feasibility of said single feedstock of carbonaceous materials;
after said determining, while continuing the pyrolyzing of the single feedstock of carbonaceous materials, customizing said single feedstock into a predetermined material composition to form a customized single feedstock;
determining if further modifying of the single feedstock of carbonaceous materials is needed to produce a predetermined pyrolyzation output while pyrolyzation continues; and
pyrolyzing said customized single feedstock in a pyrolyzer to produce coke material and coke by-products.

7. The method of claim 6 wherein the single feedstock of carbonaceous materials is selected from the group consisting of
a composition comprising particles of a particular shape;
a composition corresponding to a particular by-product generation;
a composition comprising particles of a particular reactivity;
a composition comprising particles of a particular size;
a composition comprising particles of a particular strength; and
a composition comprising particles of a particular heating value.

8. A method for producing coke comprising:
introducing a first source of carbonaceous material as a first feedstock into a mixer;
introducing a second source of carbonaceous material as a second feedstock into the mixer;
mixing at least the first and second source carbonaceous materials into a single feedstock of carbonaceous materials;
analyzing said single feedstock of carbonaceous materials to determine its coking feasibility while pyrolyzing the single feedstock of carbonaceous materials to determine if the pyrolyzing of the single feedstock produces a predetermined pyrolyzation output;
after said analyzing, customizing said single feedstock into a predetermined material composition to form a customized single feedstock;
while continuing the pyrolyzing of the single feedstock of carbonaceous materials, determining if further customizing of the single feedstock of carbonaceous materials is needed to produce a predetermined pyrolyzation output; and
continuing to pyrolyze said customized single feedstock in a pyrolyzer to produce coke material which has at least a 600 lbs per square inch crushing strength.

* * * * *